(12) United States Patent
Mohan et al.

(10) Patent No.: US 10,242,229 B2
(45) Date of Patent: Mar. 26, 2019

(54) METHOD AND APPARATUS FOR MANAGING ACCESS TO A DATABASE

(71) Applicant: TELEFONAKTIEBOLAGET LM ERICSSON (PUBL), Stockholm (SE)

(72) Inventors: Saravanan Mohan, Chennai (IN); Kumaresh Sreedhar, Chennai (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 87 days.

(21) Appl. No.: 15/106,803

(22) PCT Filed: Dec. 20, 2013

(86) PCT No.: PCT/EP2013/077687
§ 371 (c)(1),
(2) Date: Jun. 20, 2016

(87) PCT Pub. No.: WO2015/090445
PCT Pub. Date: Jun. 25, 2015

(65) Prior Publication Data
US 2016/0335455 A1    Nov. 17, 2016

(51) Int. Cl.
*G06F 21/00* (2013.01)
*G06F 21/62* (2013.01)
*G06F 17/30* (2006.01)

(52) U.S. Cl.
CPC .... *G06F 21/6254* (2013.01); *G06F 17/30979* (2013.01)

(58) Field of Classification Search
CPC ............ G06F 21/6218; G06F 21/6254; G06F 17/30554; G06F 17/30979

USPC .......................................................... 726/28
See application file for complete search history.

(56) References Cited

U.S. PATENT DOCUMENTS

| 7,853,545 B2 | 12/2010 | Chang et al. |
| 2006/0200431 A1 | 9/2006 | Dwork et al. |
| 2007/0130147 A1 | 6/2007 | Dwork et al. |
| 2007/0143289 A1* | 6/2007 | Dwork .............. G06F 17/30477 |

OTHER PUBLICATIONS

Cuppen M. Secure data perturbation in statistical disclosure control. PhD Thesis, Statistics Netherlands, 2000.*
Namito. U Quadratic Distribution, Jun. 2013.*
International Search Report and Written Opinion dated Aug. 21, 2014, in International Application No. PCT/EP2013/077687, 9 pages.
Haeberlen et al. "Differential Privacy Under Fire" University of Pennsylvania, 2011, 15 pages.
(Continued)

*Primary Examiner* — Syed A Zaidi
(74) *Attorney, Agent, or Firm* — Rothwell, Figg, Ernst & Manbeck, P.C.

(57) ABSTRACT

A method (100, 400) for managing access to a database is disclosed. The method comprises receiving a database query, (110), executing the query on the database to obtain a result, (120), generating a noise value, (130), perturbing the result with the generated noise value, (140), and outputting the perturbed result, (150). The noise value is generated from a bimodal probability distribution having a minimum probability at zero noise. Also disclosed is an access management processing element, (200, 300, 600) for a database.

14 Claims, 9 Drawing Sheets

(56) References Cited

OTHER PUBLICATIONS

Ganta et al. "Composition Attacks and Auxiliary Information in Data Privacy" ACM, 2008, 11 pages.
Leber "How Wireless Carriers Are Monetizing Your Movements" 2013, 3 pages.
Sarathy et al. "Some Additional insights on Applying Differential Privacy for Numeric Data" PSD, 2010, 11 pages.
de Montjoye et al. "Unique in the Crowd: The privacy bounds of human mobility" Scientific Reports, 3:1376, 2013, 5 pages.

* cited by examiner

METHOD AND APPARATUS FOR MANAGING ACCESS TO A DATABASE

CROSS REFERENCE TO RELATED APPLICATION(S)

This application is a 35 U.S.C. § 371 National Phase Entry Application from PCT/EP2013/077687, filed Dec. 20, 2013, designating the United States, the disclosure of which is incorporated herein in its entirety by reference.

TECHNICAL FIELD

The present invention relates to a method and apparatus for managing access to a database. The present invention also relates to a computer program product configured, when run on a computer, to carry out a method for managing access to a database.

BACKGROUND

Large amounts of personal data are collated and stored by a range of businesses and organisations. In many circumstances, it is desirable to share insight and intelligence that may be gained from such data, without compromising the privacy of individuals contributing to the data. One way in which this may be achieved is through the construction of a statistical database, which holds the personal data and accepts queries from third parties. Instead of releasing individual data entries, the statistical database gives out statistical results based on the characteristics of the personal data held within the database. Example queries which may be submitted include summations or aggregate counts. In order to provide increased privacy protection for individuals contributing to the database, the statistical database may release inaccurate results, such as a range within which the query result falls, rather than the value of the query result.

In principle, statistical databases permit the sharing of intelligence gained from personal data without compromising the privacy of individual data entries. However, malicious third parties, known as adversaries, may formulate queries with the specific purpose of deducing individual data entries from the database. Using carefully formulated query combinations, frequently combined with auxiliary information obtained from other independent sources, adversaries can gain access to individual data entries.

The growth of communication networks has led to an unprecedented rise in the volume and detail of personal data available to the operators of such networks and to service providers who offer services through the networks. This data may include details of subscriber interests, commercial activities and subscriber location, as well as identity data and mobility data for the subscriber. Mobility data contains the approximate whereabouts of individual subscribers in the network at any given time, and can be used to reconstruct an individual's movements over a period of time. Individual mobility traces have been used to provide personalised services to users including tracking the movement of a competitor sales force, registering subscriber attendance at a particular event or individual subscriber presence in a specific location (e.g. hotel, commercial centre or hospital). Such data may also be used by service providers or third party marketers for the development of personalised advertising campaigns. Anonymised mobility data may also be provided to third parties for use in human mobility analysis, which involves the study of individual and group movement patterns in order to provide useful insight for a range of practical applications including urban planning, traffic congestion mitigation, mass transit planning, healthcare and education planning, ecological and green development etc.

Communication network providers may thus make legitimate use of statistical data based on the large volume of information about subscribers' real world activities to which they have access. They may also make such statistical data available for legitimate third party use. However, unethical advertisers or other adversaries may seek to acquire from the statistical data sensitive information about individual subscribers in order to support aggressive or abusive marketing practices. This may involve combining data from different independent sources with complex database query combinations in order, for example, to track individual user locations or other sensitive individual data. This data may then be used for aggressive marketing or to create a highly individualised, believable message for the targeting of even more sensitive information from the user, as is the case in phishing scams and other spam mail.

Although an anonymized dataset does not contain name, home address, phone number or other identifiers, if an individual's mobility patterns are sufficiently unique, independently sourced secondary information may be used to link mobility data back to an individual.

In order to protect the privacy of individuals whose data may be held in a statistical database, techniques have been developed to ensure the anonymity of individual data entries and combat the above discussed abusive practices. A first technique is known as k-anonymity, and involves suppressing or generalising individual data attributes until each row or entry within the database is identical to at least k−1 other entries. Although this technique hides the personal identity of individuals within a database, it has been shown that adversaries possess sufficient additional sources of personal data to enable the mapping of individual users onto an anonymised data set, so compromising individual privacy.

Another technique which may be used to protect privacy in statistical databases is differential privacy. This technique involves adding noise to a query result before that result is released to the third party generating the query, with the aim of ensuring that the presence or absence of any particular individual in the database will not significantly affect the noise perturbed query result. In this manner, a third party is prevented from using sophisticated query combinations with auxiliary data to determine individual data entries. The noise value to be added to the query result is usually generated according to a Laplacian probability distribution, although a Gaussian distribution may also be used. The probability distribution is often scaled according to the sensitivity of the query, in an effort to balance the conflicting aims of privacy protection and the provision of useful statistical data. A probability distribution for Laplacian noise is illustrated in FIG. 1, with noise values on the x axis and probability of generating noise values on the y axis. The width of the distribution may be scaled according to the sensitivity of the query, sometimes referred to as the diameter of the query. The mean of the distribution is set to zero, such that positive and negative noise values are equally likely.

The aim of differential privacy is to perturb the results of database queries such that privacy of individuals is protected while still providing statistical data that is of value to third parties. While this technique has proved effective in the past, experiments have shown that when applied to use cases including human mobility data, as well as other existing use cases, known differential privacy techniques remain vulnerable to aggressive adversary querying strategies.

SUMMARY

It is an aim of the present invention to provide a method and apparatus which obviate or reduce at least one or more of the disadvantages mentioned above.

According to an aspect of the present invention, there is provided a method for managing access to a database, comprising receiving a database query, executing the query on the database to obtain a result, generating a noise value, perturbing the result with the generated noise value and outputting the perturbed result. The noise value is generated from a bimodal probability distribution having a minimum probability at zero noise.

The database may be a statistical database. In some examples, the noise value may be generated from a bimodal probability distribution which is bounded. Such a distribution may place limits upon the magnitude of noise values which may be used to perturb a query result.

In some examples, the noise value may be generated from a bimodal probability distribution which has a mean at zero noise.

In some examples, the noise value may be generated from a bimodal probability distribution which is a u-quadratic probability distribution.

In some examples, perturbing the result with the generated noise value may comprise adding the noise value to the generated result.

In some examples, the method may further comprise determining a sensitivity of the received database query, and generating a noise value may comprise scaling the bimodal probability distribution according to the determined sensitivity.

In some examples, sensitivity of the received database query may comprise a maximum value of the L1 norm of the difference in query result caused by the presence or absence of a single database element.

In some examples, the method may further comprise retrieving a utility parameter, and generating a noise value may comprise scaling the bimodal probability distribution according to the retrieved utility parameter. In some examples retrieving a utility parameter may comprise getting the parameter from a memory. The utility parameter may thus be selected by an operator and programmed into a memory for retrieval. Alternatively, retrieving the utility parameter may comprise generating the parameter.

In some examples, scaling according to sensitivity and utility parameter may comprise equating a vertical scale parameter of the bimodal probability distribution to a combination of the sensitivity and the utility parameter.

In some examples, the combination of sensitivity and utility parameter may comprise the square of a term formed by dividing the utility parameter by the sensitivity.

According to another aspect of the present invention, there is provided a computer program product configured, when run on a computer, to execute a method according to the first aspect of the present invention. Examples of the computer program product may be incorporated into an apparatus such as an access management processing element for a database. The computer program product may be stored on a computer-readable medium, or it could, for example, be in the form of a signal such as a downloadable data signal, or it could be in any other form. Some or all of the computer program product may be made available via download from the internet.

According to another aspect of the present invention, there is provided an access management processing element for a database, comprising a receiving unit configured to receive a database query, a query unit configured to execute the query on the database to obtain a result and a privacy unit configured to generate a noise value and to perturb the result with the generated noise value. The access management processing element further comprises an output unit configured to output the perturbed result. The privacy unit is configured to generate the noise value from a bimodal probability distribution having a minimum probability at zero noise. According to examples of the invention, the units of the access management processing element may be functional units, which may be realised in any combination of hardware and/or software.

In some examples, the privacy unit may be configured to generate the noise value from a bimodal probability distribution which is bounded.

In some examples, the privacy unit may be configured to generate the noise value from a bimodal probability distribution which has a mean at zero noise.

In some examples, the privacy unit may be configured to generate the noise value from a u-quadratic probability distribution.

In some examples, the privacy unit may be configured to perturb the result with the generated noise value by adding the noise value to the generated result.

In some examples, the privacy unit may comprise a query analyser configured to determine a sensitivity of the received database query, and the privacy unit may be configured to scale the bimodal probability distribution according to the determined sensitivity.

In some examples, the privacy unit may further comprise a utility unit configured to retrieve a utility parameter, and the privacy unit may be configured to scale the bimodal probability distribution according to the retrieved utility parameter.

In some examples, the privacy unit may be configured to equate a vertical scale parameter of the bimodal probability distribution to a combination of the sensitivity and the utility parameter In some examples, the combination of sensitivity and utility parameter may comprise the square of a term formed by dividing the utility parameter by the sensitivity.

According to another aspect of the present invention, there is provided an access management processing element for a database, the access management processing element comprising a processor and a memory, the memory containing instructions executable by the processor whereby the access management processing element is operative to receive a database query, execute the query on the database to obtain a result, generate a noise value, perturb the result with the generated noise value and output the perturbed result. The access management processing element is further operative to generate the noise value from a bimodal probability distribution having a minimum probability at zero noise.

In some examples, the access management processing element may be further operative to generate the noise value from a bimodal probability distribution which is bounded.

In some examples, the access management processing element may be further operative to generate the noise value from a bimodal probability distribution which has a mean at zero noise.

In some examples, the access management processing element may be further operative to generate the noise value from a bimodal probability distribution which is a u-quadratic probability distribution.

In some examples, the access management processing element may be further operative to perturb the result with the generated noise value by adding the noise value to the generated result.

In some examples, the access management processing element may be further operative to determine a sensitivity of the received database query and to scale the bimodal probability distribution according to the determined sensitivity.

In some examples, the access management processing element may be further operative to retrieve a utility parameter and to scale the bimodal probability distribution according to the retrieved utility parameter.

In some examples, the access management processing element may be further operative to equate a vertical scale parameter of the bimodal probability distribution to a combination of the sensitivity and the utility parameter.

In some examples, the combination of sensitivity and utility parameter may comprise the square of a term formed by dividing the utility parameter by the sensitivity.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Figure 1:
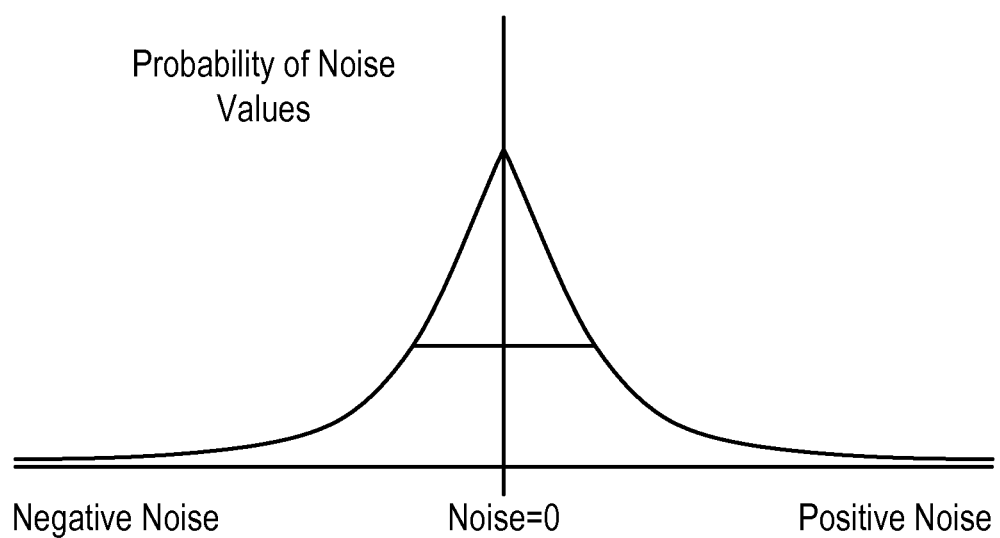
FIG. 1 illustrates the probability density function for a Laplace distribution.
Figure 2:
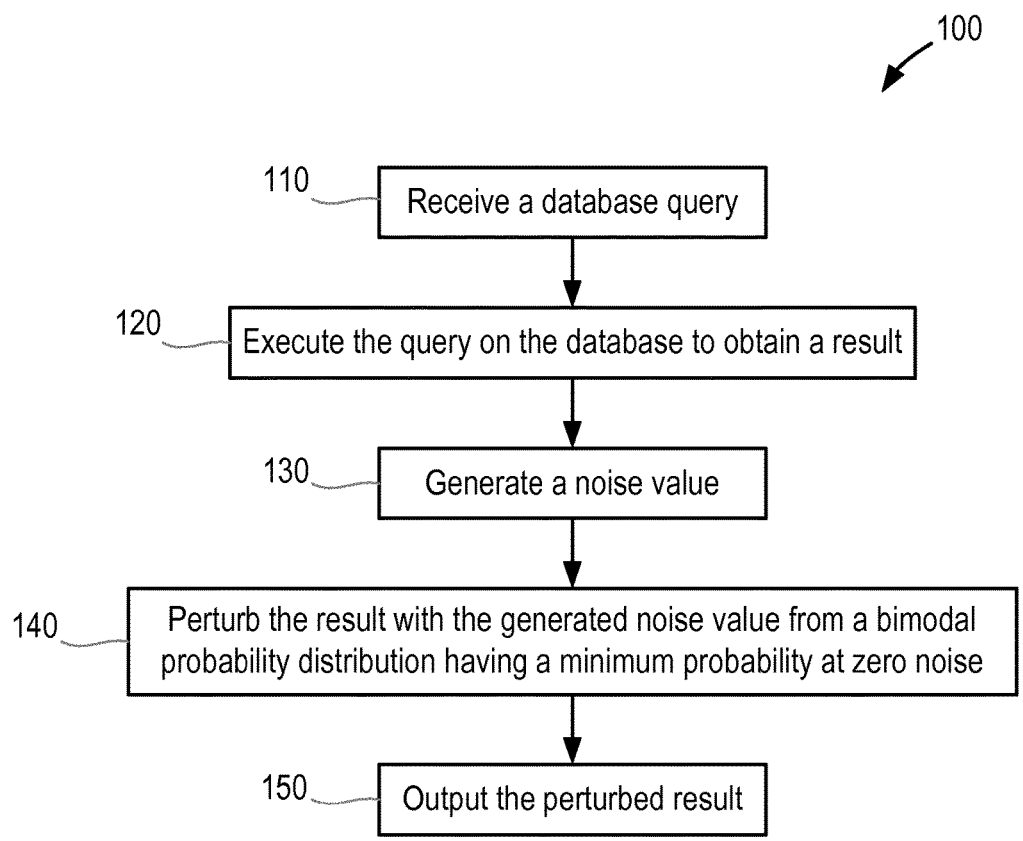
FIG. 2 is a flow chart showing steps in a method for managing access to a database.

Aspects of the present invention provide a method for managing access to a database, which may be a statistical database. Examples of the method allow for efficient balancing of utility of released information with protection of privacy for individuals whose data is present in the database. FIG. 2 is a flow chart illustrating steps in such a method 100. As discussed in further detail below, the method may run on a dedicated processing element controlling access to the database. Such a processing element may be located with the database or in a dedicated network node of a communications network operating and populating the database.

With reference to FIG. 2, in a first step 110 the method comprises receiving a database query. The database query may be in a prescribed form such as a summation query or other forms of query specified by the operator of the database to be acceptable. In a second step 120, the method comprises executing the received query on the database to obtain a result. The method then comprises, at step 130, generating a noise value, which noise value is then used to perturb the query result in step 140. The noise value is generated from a bimodal probability distribution having a minimum probability at zero noise. Finally, at step 150, the perturbed result is outputted to the third party with whom the query originated.

The database may for example be a statistical database, containing data compiled by an authority such as a communications network operator. Such operators may wish to make statistical information relating to the data in the database available to third parties, such as third party marketing companies. The operators may therefore allow such third parties to interact with the database by submitting queries. As discussed in the background section, malicious third parties, known as adversaries may attempt to determine individual data entries from the database through complex querying strategies and the use of independently obtained auxiliary data. In order to protect the individuals whose data is contained in the database, the methods of the present invention act as a release mechanism, perturbing an actual query result with a noise value, so protecting the privacy of individuals while still providing useful data to the third party.

A feature of the above method 100 is that the noise value used to perturb the query result is generated from a bimodal probability distribution having a minimum probability at zero noise. As discussed above, known differential privacy methods have in the past used Laplace or Gaussian probability distributions for the generation of noise to perturb query results. The mean of these distributions is set to zero noise, such that positive and negative noise values are equally likely. Both the Laplace and Gaussian distributions have a peak or maximum probability value at zero noise, with probability values decreasing and tailing off with increasing noise values. Such distributions have been considered desirable, the thinking being that they promoted the use of small noise values, so increasing the utility of the released data to the third parties. However, the peak at zero noise means that while small noise values may be likely, the most likely action is in fact the addition of zero noise. Zero noise represents high utility data for the third party but a considerable risk to the privacy of the individuals whose data populates the database. In contrast to previous approaches, the method 100 generates noise from a bimodal distribution having a minimum probability at zero noise. The nature of a bimodal distribution means that the probability of noise values increases away from the zero noise value. According to the method 100, zero noise is therefore the least likely noise value, providing greater protection to the privacy of individuals in the database.

Figure 3:
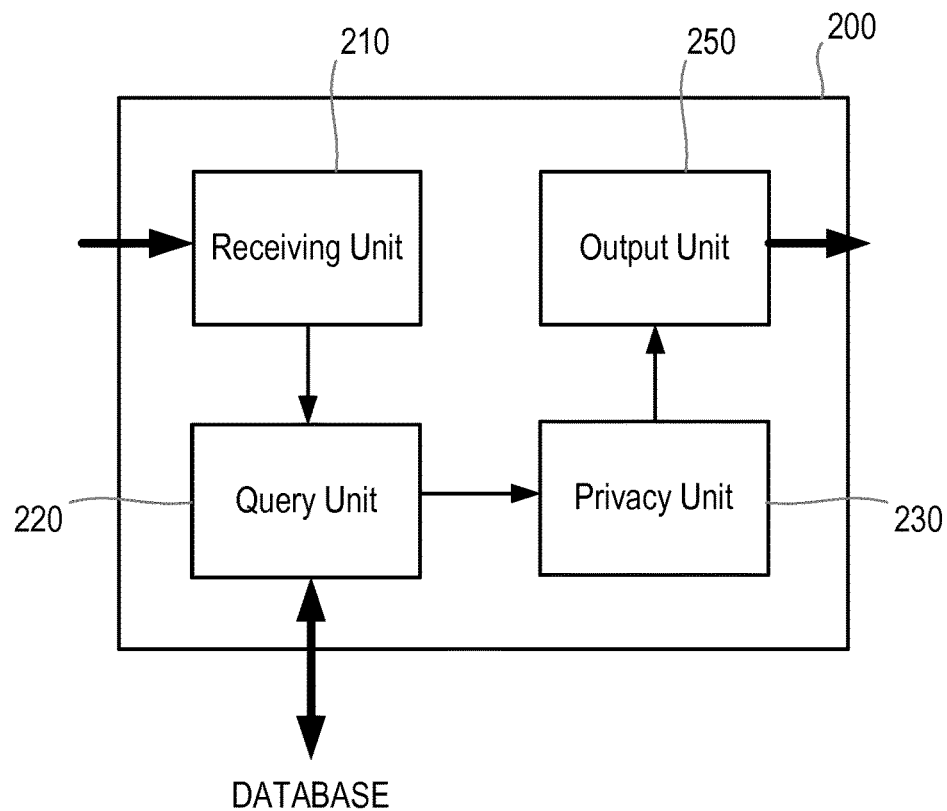
FIG. 3 is a block diagram illustrating functional units of an access management processing element for a database.

As noted above, apparatus for conducting the method 100, for example on receipt of suitable computer readable instructions, may be incorporated within a processing element, which may be a dedicated access management processing element for a database. FIG. 3 illustrates functional units in an access management processing element 200 for a database. The processing element 200 may execute the steps of FIG. 2 for example according to computer readable instructions received from a computer program. It will be understood that the units illustrated in FIG. 3 are functional units, and may be realised in any appropriate combination of hardware and/or software.

With reference to FIG. 3, the access management processing element 200 comprises a receiving unit 210, a query unit 220, a privacy unit 230 and an output unit 250. The receiving unit 210 is configured to receive a database query from a third party. The receiving unit passes the query to the query unit 220, which is configured to execute the query on the database, returning a query result. The query unit 220 passes the query result to the privacy unit 230, which is configured to generate a noise value and to perturb the query result with the generated noise value, the noise value being generated from a bimodal probability distribution having a minimum probability at zero noise. The privacy unit 230 then passes the perturbed query result to the output unit 250, which is configured to output the perturbed query result to the third party. In some examples of the invention, the privacy unit 230 may further comprise additional functional sub units, the functionality of which is discussed in further detail below with reference to FIG. 8.

Figure 4:
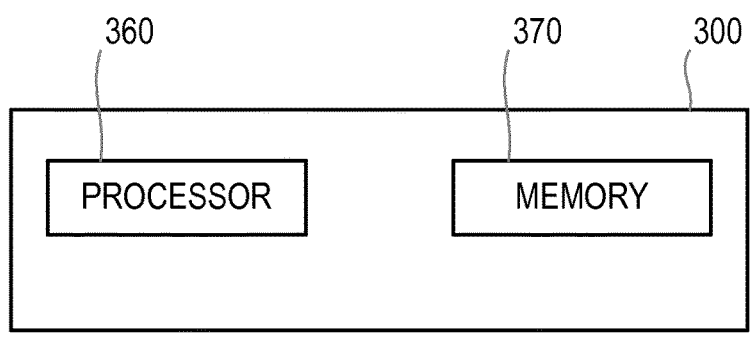
FIG. 4 is a block diagram illustrating functional units of another access management processing element for a database.

Referring to FIG. 4, in another example, an access management processing element 300 for a database may comprise a processor 360 and a memory 370. The memory 370 contains instructions executable by the processor 360 such that the processing element 300 is operative to conduct the steps of FIG. 2 described above.

Operation of the method of FIG. 2, for example executed by processing elements according to FIGS. 3 and 4, is now described in greater detail with reference to FIGS. 5 to 8.

Figure 5:
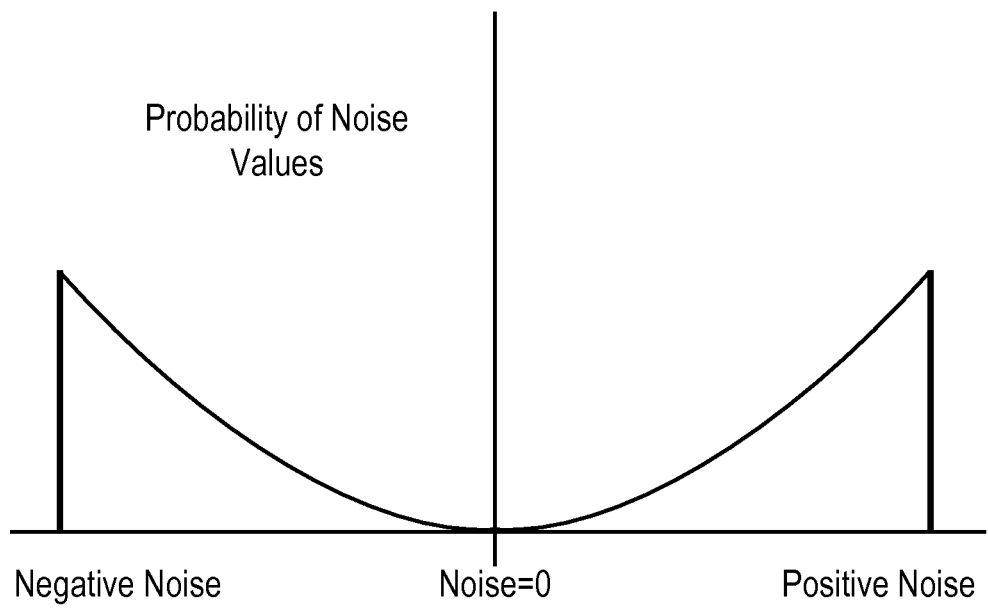
FIG. 5 illustrates the probability density function for a u-quadratic distribution.

In some examples of the invention, the bimodal probability distribution used to generate a noise value may be a u-quadratic probability distribution, an example of which is illustrated in FIG. 5. The u-quadratic distribution is a polynomial bimodal distribution with peaks at both the minimum and maximum noise that could be used to perturb the true value of the query result, for example by being added to the true query result. The core of the u-quadratic distribution is a quadratic function and the curve is inverted-bell shaped, or u-shaped. The continuous u-quadratic distribution is defined by a unique quadratic function with lower limit "a" and upper limit "b":

$$f(x|a,b,\alpha,\beta)=\alpha(x-\beta)^2, \text{ for } x\in[a,b] \quad \text{Equation 1}$$

The distribution has only two parameters a, b, as α and β are explicit functions of the support defined by a and b:

The gravitational balance centre or offset β is defined as: $\beta=(b+a)/2$     Equation 2

The vertical scale α is defined as: $\alpha=12/(b-a)^3$     Equation 3 for a $\in$(−Infinity, Infinity), and b $\in$(a, Infinity)
The mean and variance of the distribution are defined as:

Mean=$(a+b)/2$ and Variance=$3(b-a)^2/20$     Equations 4 and 5

According to examples of the present invention, the mean is set to zero such that the generation of positive and negative noise values is equally likely. The u-quadratic distribution offers two importance features with respect to the generation of noise values for perturbing query results: the preservation of privacy and the preservation of utility. The importance of balancing privacy protection with the release of useful data has been discussed above, and noise generated according to a u-quadratic probability distribution offers an effective solution to the problem of balancing these conflicting aims.

Privacy Preservation

The u-quadratic probability function slopes upwards in both the directions from the mean of zero noise. Consequently, the probability density curve has a base at zero noise, meaning that the probability of generating zero noise for perturbing the query result is at or around zero. Ensuring that a non-zero noise is used in at least a significant majority of cases affords improved privacy protection with respect to previously known methods. Additionally, every noise value in the domain except zero possesses a non-zero probability, resulting in use of a non-zero noise value to perturb every query result: action to protect individual privacy is thus always taken. Evidence of this improved privacy protection can be seen in Experiments 1 and 2 below.

Utility Preservation

The u-quadratic distribution is a bounded distribution and hence there exists no possibility for use of an unbounded noise value with a query result, which noise value might render the final disclosed output useless. Laplace and Gaussian distributions are unbounded. Although the probability of noise values reduces with increasing noise magnitude, the probability even at very high noise value is non zero, meaning the possibility exists for the generation of very large positive or negative noise values, the use of which could render the outputted query result meaningless. In contrast to the unbounded Laplace and Gaussian distributions, the u-quadratic distribution has maximum and minimum values a and b, which values may be scaled according to the nature of the query, as discussed in further detail below. These limits unsure an excessively large noise value is never used and so provide increased utility of data released to third parties. Evidence of this increased utility can be seen in Experiment 3 below.

In some examples, the u-quadratic probability distribution used to generate noise values may be scaled according to a sensitivity of the query received, where sensitivity provides an indication of how results of the query differ with changes to the contents of the database. The noise used to perturb the query result may thus be adjusted according to the nature of the query and of the information in the database: if the query and database are such that a difference in a single database element has very little impact on the query result, then only small noise perturbation may be necessary to protect privacy. However, if a single element difference in the database has a large impact on the query result, then a greater noise perturbation may be required to protect privacy, and hence the probability distribution used to generate the noise values may be scaled to increase the probability of generating larger noise values.

Sensitivity may thus comprise an indication of the difference in query outcome depending on the presence or absence of single database element. The indication may be a maximum value of the L1 norm of the difference in query result caused by the presence or absence of a single database element. Thus, for two statistical databases D1, D2 which differ on a single element, the sensitivity Δf of a query f(D) may be given as:

$$\Delta f = \max_{D1,D2} \|f(D1)-f(D2)\|_1 \quad \text{Equation 6}$$

In order to protect individual privacy, it is desirable to perturb query results such that the difference in result when run on database D1 and database D2 is minimal, so reducing the possibility for a malicious third party to infer individual data entries from different query results. By scaling the probability distribution according to query sensitivity, the probability of generating particular noise values is adjusted to match the magnitude of noise that is likely to be necessary to achieve the desired privacy protection.

A utility parameter γ may also be introduced in order to adjust the scaling of the probability distribution according to a desired balance between privacy protection and data utility. The utility parameter γ expresses the accuracy of the perturbed output query, and thus provides a numerical representation of the balance to be achieved between privacy and utility of data. Thus for two datasets D1, D2 which differ only on a single element:

$$Pr[Z(D1) \in T] \leq \gamma^2 Pr[Z(D2) \in T] \qquad \text{Equation 7}$$

where Z is a randomized γ-quadratically private algorithm for all datasets D1 and D2, T ⊆ Range(Z) and Range(Z) denotes the output range of the algorithm Z.

Scaling of the u-quadratic probability distribution may be conducted on the basis both of the sensitivity Δf of the query to be executed and the utility parameter γ to be applied. Scaling is accomplished by equating the vertical scale α of the distribution to the square of the term formed by dividing the utility parameter γ by the sensitivity Δf:

$$\alpha = (\gamma/\Delta f)^2 \qquad \text{Equation 8}$$

Scaling the u-quadratic probability distribution in this way ensures that as the need for privacy increases (increasing Δt), the vertical scale α reduces. The maximum and minimum noise limits a and b thus increase leading to an increase in the mean noise value to be applied. In extreme cases, as γ tends towards 0, maximum privacy is assured as the perturbed output is rendered useless by the very high level of noise. Conversely, as the utility parameter γ increases, the vertical scale increases, the limits a and b reduce and the mean noise to be generated also reduces.

This vertical scale may be combined with the centring of the distribution at zero noise, which leads to:

$$\beta = 0 \qquad \text{Equation 9}$$

Thus the u-quadratic distribution may be calculated to allow the generation of appropriate noise values for a particular query.

Figure 6:
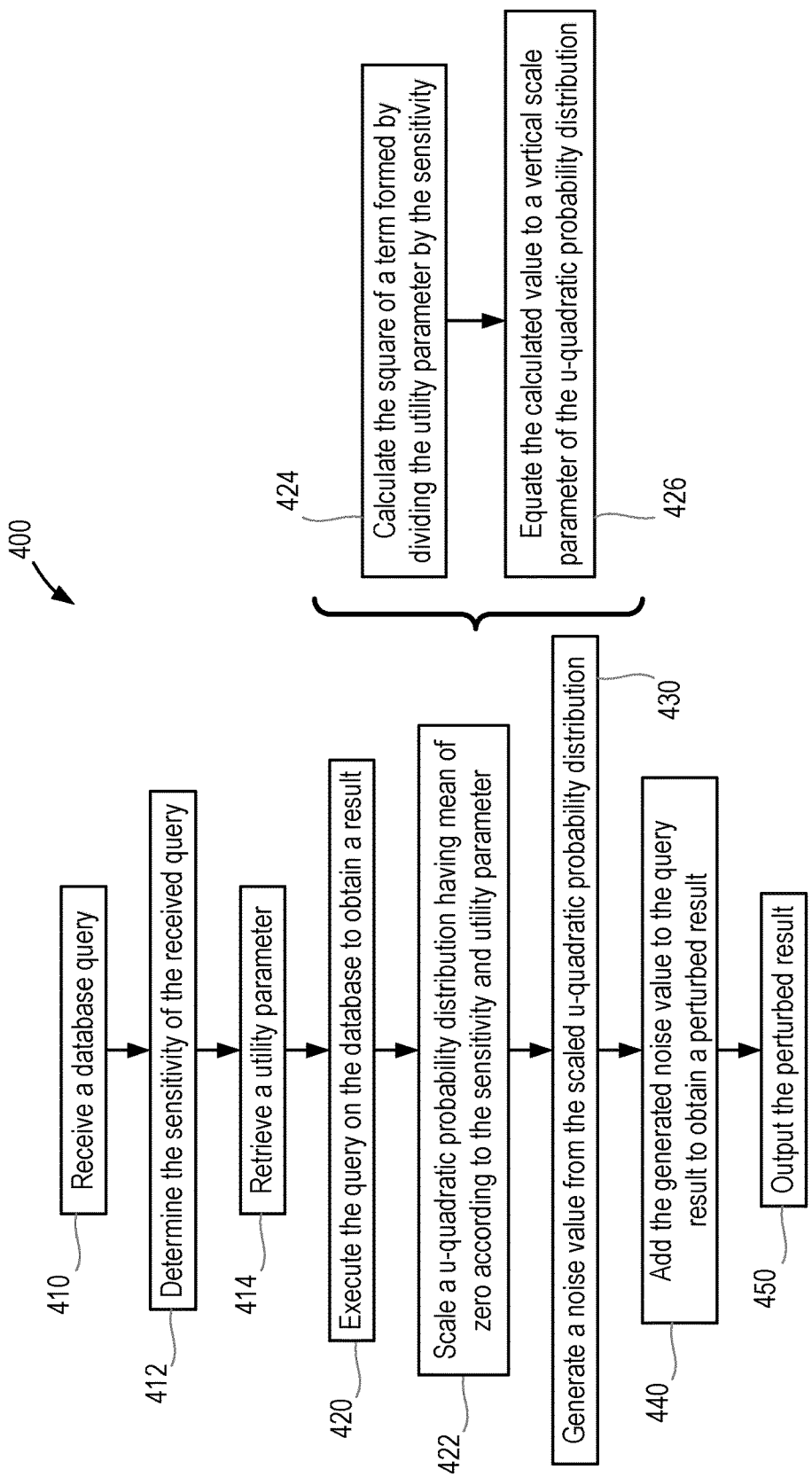
FIG. 6 is a flow chart showing steps in another method for managing access to a database.

FIG. 6 illustrates steps in a method 400 for managing access to a database according to an example of the invention. The method 400 expands upon the steps of the method 100, incorporating additional features as discussed above. With reference to FIG. 6, in a first step 410, the method comprises receiving a query from the third party relating to the database. In many cases, the query will be formed by a third party seeking to obtain information for legitimate purposes. However, in some cases, a malicious third party, or adversary, will submit queries in a carefully formulated combination with a view to determining individual database entries from the combined query results, often in conjunction with data from other independent sources.

On receipt of the query, the method then comprises determining the sensitivity of the received query at step 412 and retrieving a utility parameter at step 414. The sensitivity of the query may be calculated using Equation 6 above, and the utility parameter may for example be retrieved from a memory or generated in another appropriate way. In some examples, specific utility parameters may be imposed for particular third parties, or for particular sections of the database, according to the balance between utility and privacy that may be appropriate for certain more sensitive data, or to provide increased protection when responding to queries from third parties whose authenticity or motives may not be fully established.

In a subsequent step 420, the method comprises executing the query on the database to obtain a result. The method then comprises, at step 422 scaling a u-quadratic probability distribution having a mean of zero according to the determined sensitivity and utility parameter. Step 422 may comprise, in a first sub step 424, calculating the square of a term formed by dividing the utility parameter by the sensitivity, and in a second sub step 426, equating the calculated value to a vertical scale parameter of the u-quadratic probability distribution.

Once the u-quadratic probability distribution has been scaled, the method comprises, at step 430, generating a noise value from the scaled u-quadratic probability distribution. The method then comprises perturbing the query result with the generated noise value by adding the noise value to the query result in step 440. Finally the method comprises outputting the perturbed result at step 450.

Figure 7:
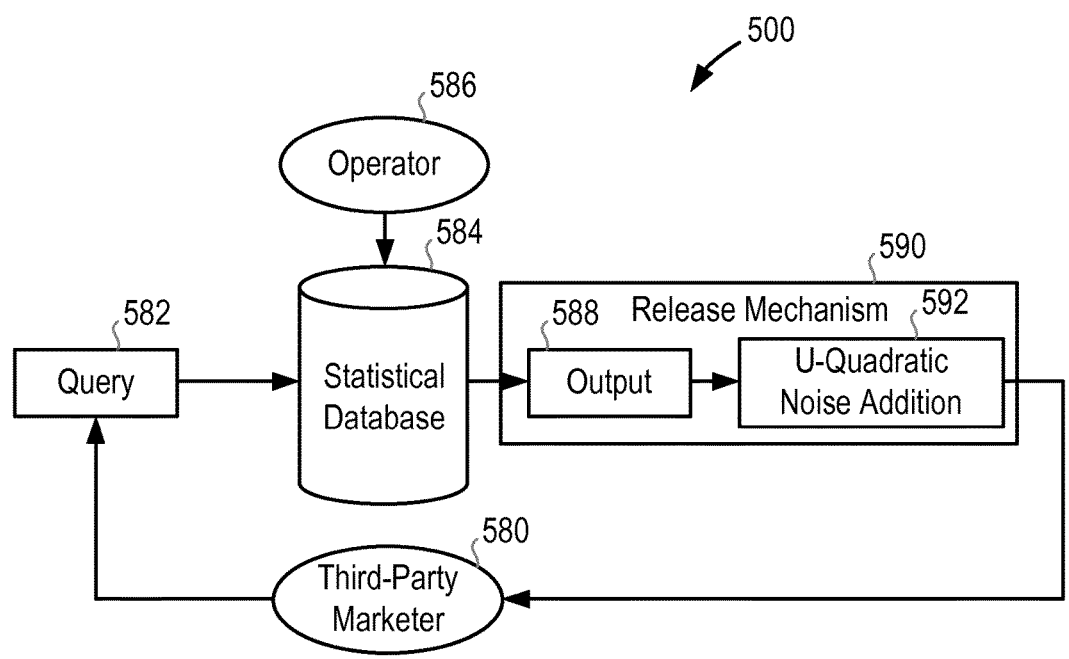
FIG. 7 is a block diagram representation of operation of the method of FIG. 6.

The method 400 of FIG. 6 results in a system 500 that operates substantially as illustrated in FIG. 7. With reference to FIG. 7, a third party 580, which may for example be a marketing company, submits a query 582 to a statistical database 584, which may for example be populated by an operator 586 of a communications network. The query is executed on the database and the result or output 588 passes to processing that acts as a release mechanism 590 on the data. The release mechanism adds u-quadratic generated noise 592 to the output according to the sensitivity of the query and an appropriate utility parameter, before the noisy output is released to the third party 580.

Figure 8:
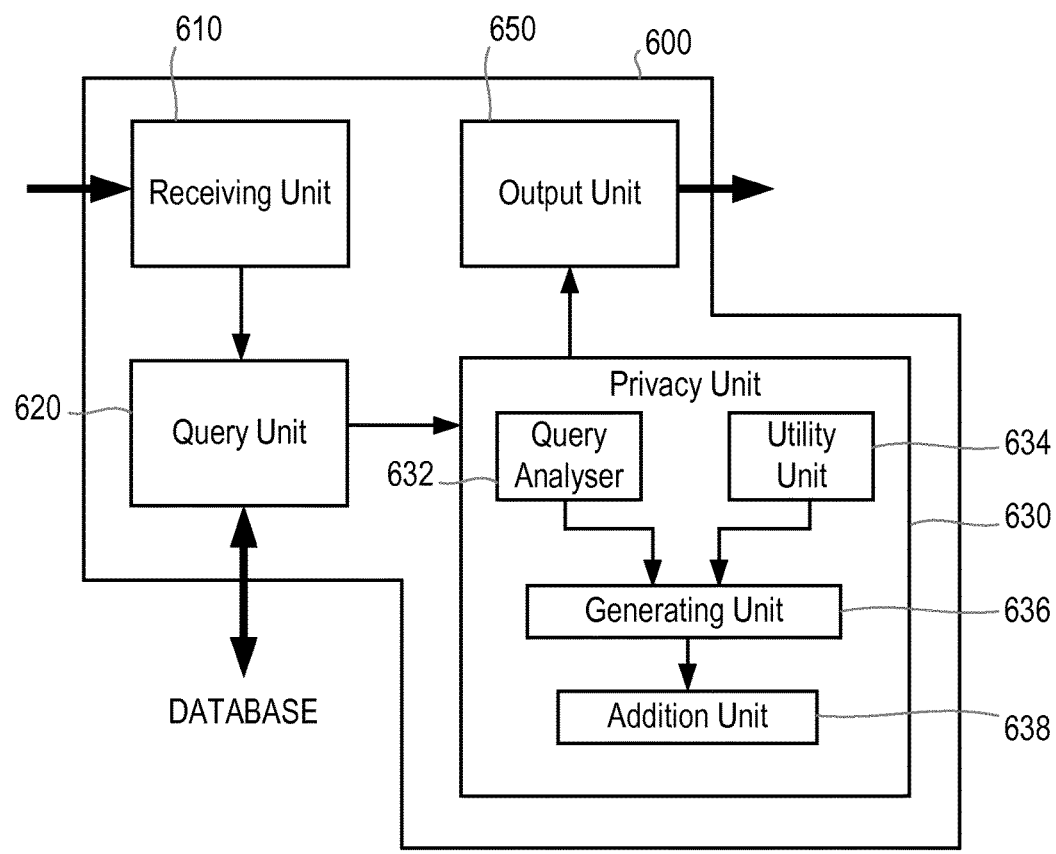
FIG. 8 is a block diagram illustrating functional units of another access management processing element for a database.

The steps of the method 400 may be executed by an access management processing element, for example according to suitable computer readable instructions. FIG. 8 illustrates functional units in such an access management processing element 600 for a database. It will be understood that the units illustrated in FIG. 8 are functional units, and may be realised in any appropriate combination of hardware and/or software.

The processing element 600 comprises a receiving unit 610, query unit 620 and output unit 650, all configured substantially as explained above with respect to the corresponding units in the processing element 200 of FIG. 3. Briefly, the receiving unit 610 receives a third party query and passes the query to the query unit 620 to be executed on the database. The query unit 620 passes the query result to a privacy unit 630. The output unit 650 receives a perturbed result from the privacy unit 630 and outputs this perturbed result to the third party.

The privacy unit 630 comprises several sub units, including a query analyser 632, a utility unit 634, a generating unit 636 and an addition unit 638. The query analyser is configured to determine a sensitivity of the received query, and the utility unit 634 is configured to retrieve a utility parameter. The generating unit 636 is receives the determined sensitivity and retrieved utility parameter and is configured to generate a noise value from a u-quadratic probability distribution scaled according to the sensitivity and utility parameter. Finally the addition unit 638 is configured to add the generated noise value to the query output before the privacy unit forwards the so generated noisy result to the output unit 650.

The following three experiments demonstrate the effectiveness of the methods of the present invention. The first experiment demonstrates aspects of the invention in isolation. The second two experiments demonstrate aspects of the invention compared with a prior known method in which noise generated according to a Laplace distribution is added to query results.

First Experiment

The first experiment illustrates the effectiveness of a method according to the present invention using a scenario of a communications network operator releasing statistical data from a database containing network user information.

A statistical database holding sensitive information was generated, the database containing 0.12 million records of 0.01 million unique users with fields including, TIMESTAMP, USER_ID, DURATION_OF_STAY, LOCALITY, SUB_LOCALITY, and DESTINATION. The database contained information about the originating location of every user, and the destinations visited by them over a period of 3 months. The most sensitive information in the database is the originating location of a mobile user, as this could be used for aggressive marketing by an adversary. Access to the database was allowed in the form of sum queries that could return the number of users originating from a specific pair <locality, sub-locality> up to a specific row. A row was identified by a combination of the timestamp, duration of stay and destination fields. It was assumed that an adversary had an independent source of information that provided the row (n) of the database in which the information relating to one specific user actually resided. So, without any privacy protection on the data, the adversary could determine the originating location of that user simply executing two queries: a sum executed to row n and a sum to row n−1, and calculating the difference between them.

In order to protect individual privacy, the method of FIG. 6 was used to perturb the query results before releasing them, adding to the query result a random noise generated from a bounded u-quadratic distribution whose vertical-scale parameter ($\alpha$) was calibrated to the sensitivity measure of the query ($\Delta f=1$ in this case) and to a utility parameter (y=0.25 in this case).

Figure 9:
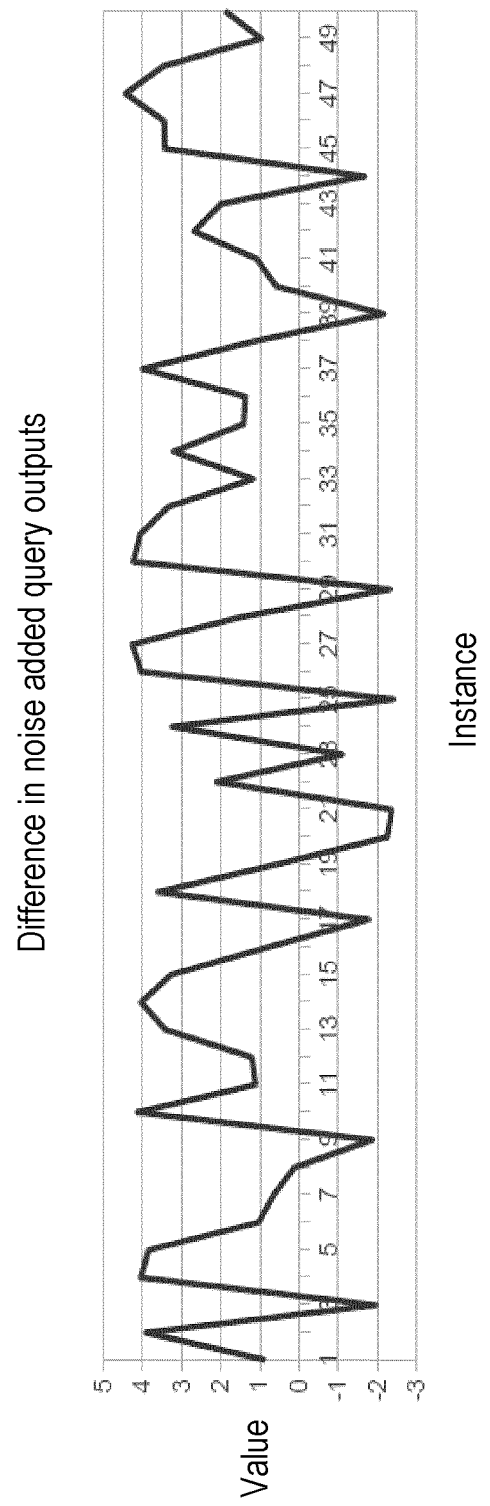
FIGS. 9 and 10 are graphs illustrating the results of experiments investigating effectiveness of the method of FIG. 6.

Table 1 below illustrates the results of 50 instances of the pared queries "sum to row n" and "sum to row n−1", including for each query the actual query result, the random number used, the resulting u-quadratic noise and the resultant noisy result. The table also includes the difference between the two noisy results for each air of queries. The difference between the noisy results is plotted on the graph of FIG. 9, with the difference on the y axis and the query instance on the x axis. It can be seen that while the average difference remains reasonable within the scope of the enquiry, it does not provide sufficient information to deduce the originating location of the network user in row n. The privacy of the user appearing in row n is thus protected.

TABLE 1

| Output of Query 1 | Random # | UQ Noise | Disclosed Output | Output of Query 2 | Random # | UQ Noise | Disclosed Output | Difference |
|---|---|---|---|---|---|---|---|---|
| 2 | 0.80015 | 1.53288 | 3.53288 | 1 | 0.9098 | 1.70053 | 2.70053 | 0.83235 |
| 2 | 0.60692 | 1.08662 | 3.08662 | 1 | 0.019 | −1.7938 | −0.7938 | 3.88042 |
| 2 | 0.08502 | −1.70766 | 0.29234 | 1 | 0.67052 | 1.26956 | 2.26956 | −1.97722 |
| 2 | 0.79726 | 1.52795 | 3.52795 | 1 | 0.22303 | −1.49234 | −0.49234 | 4.02029 |
| 2 | 0.92163 | 1.71674 | 3.71674 | 1 | 0.38836 | −1.10239 | −0.10239 | 3.81913 |
| 2 | 0.05061 | −1.75361 | 0.24639 | 1 | 0.04219 | −1.7645 | −0.7645 | 1.01089 |
| 2 | 0.36268 | −1.18114 | 0.81886 | 1 | 0.45602 | −0.8081 | 0.1919 | 0.62696 |
| 2 | 0.04375 | −1.7625 | 0.2375 | 1 | 0.44774 | −0.85594 | 0.14406 | 0.09344 |
| 2 | 0.0605 | −1.74065 | 0.25935 | 1 | 0.62888 | 1.15643 | 2.15643 | −1.89708 |
| 2 | 0.89643 | 1.68183 | 3.68183 | 1 | 0.25975 | −1.42324 | −0.42324 | 4.10507 |
| 2 | 0.29184 | −1.35683 | 0.64317 | 1 | 0.2436 | −1.45445 | −0.45445 | 1.09762 |
| 2 | 0.9243 | 1.72036 | 3.72036 | 1 | 0.80458 | 1.54039 | 2.54039 | 1.17997 |
| 2 | 0.92428 | 1.72034 | 3.72034 | 1 | 0.47473 | −0.67185 | 0.32815 | 3.39219 |
| 2 | 0.89885 | 1.68525 | 3.68525 | 1 | 0.30451 | −1.32871 | −0.32871 | 4.01396 |
| 2 | 0.71616 | 1.37399 | 3.37399 | 1 | 0.44526 | −0.86927 | 0.13073 | 3.24326 |
| 2 | 0.03373 | −1.77529 | 0.22471 | 1 | 0.1988 | −1.53466 | −0.53466 | 0.75937 |
| 2 | 0.09981 | −1.68713 | 0.31287 | 1 | 0.61547 | 1.11486 | 2.11486 | −1.80199 |
| 2 | 0.81287 | 1.55423 | 3.55423 | 1 | 0.40817 | −1.03287 | −0.03287 | 3.5871 |
| 2 | 0.18251 | −1.56184 | 0.43816 | 1 | 0.38309 | −1.11945 | −0.11945 | 0.55761 |
| 2 | 0.19492 | −1.54122 | 0.45878 | 1 | 0.93353 | 1.73274 | 2.73274 | −2.27396 |
| 2 | 0.1018 | −1.68433 | 0.31567 | 1 | 0.91022 | 1.70112 | 2.70112 | −2.38545 |
| 2 | 0.46964 | −0.71421 | 1.28579 | 1 | 0.01757 | −1.79557 | −0.79557 | 2.08136 |
| 2 | 0.33244 | −1.26216 | 0.73784 | 1 | 0.55354 | 0.86291 | 1.86291 | −1.12507 |
| 2 | 0.53897 | 0.77618 | 2.77618 | 1 | 0.25132 | −1.43969 | −0.43969 | 3.21587 |
| 2 | 0.01722 | −1.79601 | 0.20399 | 1 | 0.86683 | 1.63889 | 2.63889 | −2.4349 |
| 2 | 0.74429 | 1.43119 | 3.43119 | 1 | 0.17256 | −1.57799 | −0.57799 | 4.00918 |
| 2 | 0.79513 | 1.52429 | 3.52429 | 1 | 0.08176 | −1.71211 | −0.71211 | 4.2364 |
| 2 | 0.73068 | 1.4041 | 3.4041 | 1 | 0.57862 | 0.98077 | 1.98077 | 1.42333 |
| 2 | 0.16715 | −1.58663 | 0.41337 | 1 | 0.94778 | 1.75153 | 2.75153 | −2.33816 |
| 2 | 0.85007 | 1.61354 | 3.61354 | 1 | 0.16064 | −1.59691 | −0.59691 | 4.21045 |
| 2 | 0.98898 | 1.80368 | 3.80368 | 1 | 0.34426 | −1.23175 | −0.23175 | 4.03543 |
| 2 | 0.58458 | 1.00497 | 3.00497 | 1 | 0.31414 | −1.30652 | −0.30652 | 3.31149 |
| 2 | 0.85797 | 1.62559 | 3.62559 | 1 | 0.76737 | 1.47491 | 2.47491 | 1.15068 |
| 2 | 0.69614 | 1.33021 | 3.33021 | 1 | 0.44859 | −0.8513 | 0.1487 | 3.18151 |
| 2 | 0.69054 | 1.31742 | 3.31742 | 1 | 0.5664 | 0.92707 | 1.92707 | 1.39035 |
| 2 | 0.76075 | 1.46264 | 3.46264 | 1 | 0.61476 | 1.11256 | 2.11256 | 1.35008 |
| 2 | 0.71983 | 1.38173 | 3.38173 | 1 | 0.16495 | −1.59011 | −0.59011 | 3.97184 |
| 2 | 0.36012 | −1.18844 | 0.81156 | 1 | 0.30758 | −1.32173 | −0.32173 | 1.13329 |
| 2 | 0.10955 | −1.67333 | 0.32667 | 1 | 0.7843 | 1.50541 | 2.50541 | −2.17874 |
| 2 | 0.11727 | −1.66223 | 0.33777 | 1 | 0.34764 | −1.22279 | −0.22279 | 0.56056 |
| 2 | 0.83838 | 1.59537 | 3.59537 | 1 | 0.80014 | 1.53287 | 2.53287 | 1.0625 |
| 2 | 0.56687 | 0.92927 | 2.92927 | 1 | 0.46751 | −0.73054 | 0.26946 | 2.65981 |
| 2 | 0.9948 | 1.8108 | 3.8108 | 1 | 0.55003 | 0.84362 | 1.84362 | 1.96718 |
| 2 | 0.33995 | −1.24302 | 0.75698 | 1 | 0.7501 | 1.44245 | 2.44245 | −1.68547 |
| 2 | 0.99995 | 1.81707 | 3.81707 | 1 | 0.48326 | −0.58563 | 0.41437 | 3.4027 |
| 2 | 0.56262 | 0.90915 | 2.90915 | 1 | 0.2113 | −1.51313 | −0.51313 | 3.42228 |
| 2 | 0.98811 | 1.80261 | 3.80261 | 1 | 0.15427 | −1.60684 | −0.60684 | 4.40945 |
| 2 | 0.67041 | 1.26928 | 3.26928 | 1 | 0.3665 | −1.1701 | −0.1701 | 3.43938 |

TABLE 1-continued

| Output of Query 1 | Random # | UQ Noise | Disclosed Output | Output of Query 2 | Random # | UQ Noise | Disclosed Output | Difference |
|---|---|---|---|---|---|---|---|---|
| 2 | 0.89097 | 1.67408 | 3.67408 | 1 | 0.92798 | 1.72531 | 2.72531 | 0.94877 |
| 2 | 0.9264 | 1.72319 | 3.72319 | 1 | 0.55137 | 0.85107 | 1.85107 | 1.87212 |
| | | | | | | | Average Difference | 1.57135 |

Second Experiment

The second experiment compares the vulnerability to attack of a method according to the present invention with that of a method involving the addition of Laplace noise. A vulnerability to attack test is used to determine how much a privacy preserving mechanism is vulnerable to an attack by an adversary who possesses knowledge about the type of noise distribution being used, query sensitivity, utility parameter and scaling. This experiment therefore tests the privacy preserving mechanism from an adversary's perspective to determine its effectiveness.

For the purpose of this experiment, it was assumed that the data set X with 50 observations consists of real numbers between the limits of 0 and 1. It was further assumed that an adversary has 49 observations including the observations $x_2$, $x_3$, $x_4 \ldots x_{50}$. The adversary's objective was to estimate the unknown observation $x_1$. The database allowed access in the form of sum queries and a value of 1 was used for the utility parameter $\gamma$. For this data set, the sensitivity measure of the sum query, $\Delta f=1$. The vertical-scale parameter a of a u-quadratic distribution was therefore set to $(\gamma/\Delta f)^2=1$. The distribution was centred on zero by setting $\beta=0$. The same value of utility parameter $\varepsilon=1$ was also used to scale a Laplace distribution for the generation of comparison noise.

The adversary submitted a series of queries $(x_1+x_2)$, $(x_1+x_3), \ldots, (x_1+x_{50})$ resulting in a total of 49 queries.

Figure 10:
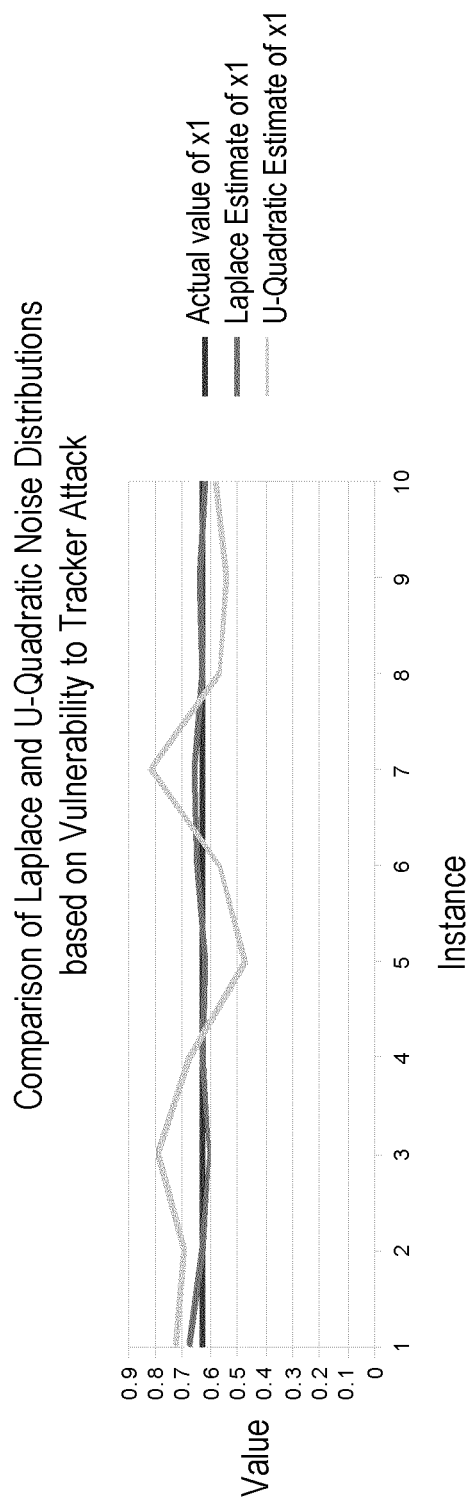

Random Laplace noise values $L_i$, and u-quadratic noise values $UQ_i$, were generated using the scaled probability distributions from the same set of random numbers. The generated noise values were each added to the actual query result to generate noisy results according to the Laplace method $((X_1+X_i)+Li))$ and the method of FIG. 6 according to the present invention $((X_1+X_i)+UQ_i)$. The adversary was already in possession of the true values for $x_2, x_3 \ldots x_{50}$, so was able to calculate an estimate of the value of $x_1$ by subtracting the relevant $x_i$ value from the released noisy result. The estimates of $x_1$ according to the Laplace method and the method of FIG. 6 are listed in Table 2 with average values for the estimate of $x_1$ at the bottom of the table. The actual value of $x_1$, the estimate based on Laplace noise and the estimate based on u-quadratic noise are also plotted against query instance in FIG. 10. It can be seen both from Table 2 and from FIG. 10 that the u-quadratic noise of the method of FIG. 6 provides improved privacy protection compared to a method using Laplace noise. For the same set of random numbers, and the same utility parameter, hence the same utility of the statistical data provided, the method of FIG. 6 provided an average estimate of the value for $x_1$ that was significantly further from the true value than that estimated using values perturbed with Laplace noise.

TABLE 2

| Individual | X | (x1 + xi) | Random # | Li | UQi | (x1 + xi) + Li | (x1 + xi) + UQi | Laplace Estimate of x1 | U-Quadratic Estimate of x1 |
|---|---|---|---|---|---|---|---|---|---|
| 1 | 0.63043 | | | | | | | | |
| 2 | 0.13021 | 0.76064 | 0.70167 | 0.5164 | 0.84578 | 1.27704 | 1.60642 | 1.14683 | 1.47621 |
| 3 | 0.04277 | 0.6732 | 0.22887 | −0.78146 | −0.93346 | −0.10826 | −0.26026 | −0.15103 | −0.30303 |
| 4 | 0.80717 | 1.4376 | 0.3105 | −0.47644 | −0.8284 | 0.96116 | 0.6092 | 0.15399 | −0.19797 |
| 5 | 0.18574 | 0.81617 | 0.72699 | 0.6051 | 0.87979 | 1.42127 | 1.69596 | 1.23553 | 1.51022 |
| 6 | 0.4439 | 1.07433 | 0.72028 | 0.58082 | 0.87104 | 1.65515 | 1.94537 | 1.21125 | 1.50147 |
| 7 | 0.53084 | 1.16127 | 0.85538 | 1.24053 | 1.02159 | 2.4018 | 2.18286 | 1.87096 | 1.65202 |
| 8 | 0.52444 | 1.15487 | 0.71664 | 0.56789 | 0.86621 | 1.72276 | 2.02108 | 1.19832 | 1.49664 |
| 9 | 0.49674 | 1.12717 | 0.60393 | 0.23302 | 0.6781 | 1.36019 | 1.80527 | 0.86345 | 1.30853 |
| 10 | 0.11111 | 0.74154 | 0.63562 | 0.31642 | 0.74101 | 1.05796 | 1.48255 | 0.94685 | 1.37144 |
| 11 | 0.8438 | 1.47423 | 0.91114 | 1.72751 | 1.07244 | 3.20174 | 2.54667 | 2.35794 | 1.70287 |
| 12 | 0.63643 | 1.26686 | 0.50092 | 0.00184 | 0.1402 | 1.2687 | 1.40706 | 0.63227 | 0.77063 |
| 13 | 0.91441 | 1.54484 | 0.41407 | −0.18857 | −0.63642 | 1.35627 | 0.90842 | 0.44186 | −0.00599 |
| 14 | 0.01829 | 0.64872 | 0.66345 | 0.39587 | 0.78858 | 1.04459 | 1.4373 | 1.0263 | 1.41901 |
| 15 | 0.84879 | 1.47922 | 0.30355 | −0.49906 | −0.8384 | 0.98016 | 0.64082 | 0.13137 | −0.20797 |
| 16 | 0.96123 | 1.59166 | 0.69729 | 0.50183 | 0.83961 | 2.09349 | 2.43127 | 1.13226 | 1.47004 |
| 17 | 0.5985 | 1.22893 | 0.69116 | 0.48177 | 0.83082 | 1.7107 | 2.05975 | 1.1122 | 1.46125 |
| 18 | 0.61551 | 1.24594 | 0.7405 | 0.65583 | 0.89691 | 1.90177 | 2.14285 | 1.28626 | 1.52734 |
| 19 | 0.20011 | 0.83054 | 0.01077 | −3.83815 | −1.13643 | −3.00761 | −0.30589 | −3.20772 | −0.506 |
| 20 | 0.04853 | 0.67896 | 0.61281 | 0.2557 | 0.69689 | 0.93466 | 1.37585 | 0.88613 | 1.32732 |
| 21 | 0.55834 | 1.18877 | 0.0967 | −1.64302 | −1.06557 | −0.45425 | 0.1232 | −1.01259 | −0.43514 |
| 22 | 0.762 | 1.39243 | 0.45638 | −0.09129 | −0.5077 | 1.30114 | 0.88473 | 0.53914 | 0.12273 |
| 23 | 0.07587 | 0.7063 | 0.36857 | −0.30497 | −0.73327 | 0.40133 | −0.02697 | 0.32546 | −0.10284 |
| 24 | 0.3609 | 0.99133 | 0.66105 | 0.38875 | 0.78469 | 1.38008 | 1.77602 | 1.01918 | 1.41512 |
| 25 | 0.21188 | 0.84231 | 0.06522 | −2.03685 | −1.0926 | −1.19454 | −0.25029 | −1.40642 | −0.46217 |
| 26 | 0.37368 | 1.00411 | 0.79645 | 0.8987 | 0.96168 | 1.90281 | 1.96579 | 1.52913 | 1.59211 |
| 27 | 0.2626 | 0.89303 | 0.40256 | −0.21675 | −0.66365 | 0.67628 | 0.22938 | 0.41368 | −0.03322 |
| 28 | 0.64265 | 1.27308 | 0.78905 | 0.86301 | 0.95361 | 2.13609 | 2.22669 | 1.49344 | 1.58404 |
| 29 | 0.84818 | 1.47861 | 0.47046 | −0.0609 | −0.44583 | 1.41771 | 1.03278 | 0.56953 | 0.1846 |
| 30 | 0.98097 | 1.6114 | 0.78077 | 0.82449 | 0.94441 | 2.43589 | 2.55581 | 1.45492 | 1.57484 |
| 31 | 0.2256 | 0.85603 | 0.35844 | −0.33283 | −0.75164 | 0.5232 | 0.10439 | 0.2976 | −0.12121 |

TABLE 2-continued

| Individual | X | (x1 + xi) | Random # | Li | UQi | (x1 + xi) + Li | (x1 + xi) + UQi | Laplace Estimate of x1 | U-Quadratic Estimate of x1 |
|---|---|---|---|---|---|---|---|---|---|
| 32 | 0.34092 | 0.97135 | 0.87671 | 1.40008 | 1.04163 | 2.37143 | 2.01298 | 2.03051 | 1.67206 |
| 33 | 0.29784 | 0.92827 | 0.52841 | 0.05849 | 0.44007 | 0.98676 | 1.36834 | 0.68892 | 1.0705 |
| 34 | 0.29451 | 0.92494 | 0.24165 | −0.72713 | −0.91856 | 0.19781 | 0.00638 | −0.0967 | −0.28813 |
| 35 | 0.17496 | 0.80539 | 0.59207 | 0.2035 | 0.65125 | 1.00889 | 1.45664 | 0.83393 | 1.28168 |
| 36 | 0.5111 | 1.14153 | 0.90994 | 1.71409 | 1.07139 | 2.85562 | 2.21292 | 2.34452 | 1.70182 |
| 37 | 0.1908 | 0.82123 | 0.05243 | −2.25508 | −1.1032 | −1.43385 | −0.28197 | −1.62465 | −0.47277 |
| 38 | 0.27187 | 0.9023 | 0.92074 | 1.84189 | 1.08073 | 2.74419 | 1.98303 | 2.47232 | 1.71116 |
| 39 | 0.16551 | 0.79594 | 0.02094 | −3.17318 | −1.1285 | −2.37724 | −0.33256 | −2.54275 | −0.49807 |
| 40 | 0.11207 | 0.7425 | 0.43337 | −0.14301 | −0.58468 | 0.59949 | 0.15782 | 0.48742 | 0.04575 |
| 41 | 0.41265 | 1.04308 | 0.60643 | 0.23934 | 0.68349 | 1.28242 | 1.72657 | 0.86977 | 1.31392 |
| 42 | 0.97992 | 1.61035 | 0.78637 | 0.85037 | 0.95065 | 2.46072 | 2.561 | 1.4808 | 1.58108 |
| 43 | 0.95348 | 1.58391 | 0.41016 | −0.19805 | −0.64593 | 1.38586 | 0.93798 | 0.43238 | −0.0155 |
| 44 | 0.97708 | 1.60751 | 0.77362 | 0.7924 | 0.93633 | 2.39991 | 2.54384 | 1.42283 | 1.56676 |
| 45 | 0.75792 | 1.38835 | 0.06381 | −2.05868 | −1.09378 | −0.67033 | 0.29457 | −1.42825 | −0.46335 |
| 46 | 0.75595 | 1.38638 | 0.97265 | 2.90579 | 1.12346 | 4.29217 | 2.50984 | 3.53622 | 1.75389 |
| 47 | 0.67356 | 1.30399 | 0.86836 | 1.33451 | 1.03387 | 2.6385 | 2.33786 | 1.96494 | 1.6643 |
| 48 | 0.03171 | 0.66214 | 0.79055 | 0.87012 | 0.95525 | 1.53226 | 1.61739 | 1.50055 | 1.58568 |
| 49 | 0.32327 | 0.9537 | 0.57341 | 0.15878 | 0.6039 | 1.11248 | 1.5576 | 0.78921 | 1.23433 |
| 50 | 0.78445 | 1.41488 | 0.02432 | −3.02325 | −1.12583 | −1.60837 | 0.28905 | −2.39282 | −0.4954 |
| | | | | | | | Average of Estimates | 0.65851 | 0.81719 |

Third Experiment

The third experiment illustrates the behavior of both a Laplace based privacy protection method and a method according to the present invention, for 100 million random instances. Table 3 below illustrates the percentage of zero noise instances for different values of the utility parameter γ (or ε in the case of Laplace noise). It can be seen from this table that instances of zero noise value are rare in the method of the present invention using a u-quadratic probability distribution, even at comparatively high values of γ, and hence when providing very high utility data. At a high value of ε=2, the Laplace method returns a zero noise value 63 percent of the time, while the method using u-quadratic noise at γ=2 returns a zero noise value only 34 percent of the time.

TABLE 3

| Epsilon/ Gamma | Percentage of Zero Laplace Noise | Percentage of Zero U-Quadratic Noise |
|---|---|---|
| 2 | 63 | 34 |
| 1.5 | 52 | 19 |
| 1 | 39 | 8 |
| 0.75 | 31 | 4 |
| 0.5 | 22 | 2 |
| 0.25 | 11 | 0 |
| 0.1 | 4 | 0 |
| 0.01 | 1 | 0 |

Table 4 below illustrates the maximum possible noise values for different values of the utility parameter γ (or ε in the case of Laplace noise). It can be seen that the unbounded Laplace distribution results in increasingly large noise values as ε, and hence the utility of the data provided, reduces. In contrast, even at low levels of utility, the noise values according to the method using u-quadratic noise remain bounded within acceptable limits.

TABLE 4

| Epsilon/ Gamma | Maximum Laplace Noise | Maximum U-Quadratic Noise |
|---|---|---|
| 3 | 5.41 | 0.73 |
| 2 | 7.21 | 0.88 |
| 1 | 10.82 | 1.16 |
| 0.75 | 14.43 | 1.4 |
| 0.5 | 21.64 | 1.84 |
| 0.25 | 43.28 | 2.91 |
| 0.1 | 108.2 | 5.37 |
| 0.01 | 1081.98 | 24.91 |

The above experiments demonstrate how aspects of the present invention provide both improved privacy protection and improved data utility when releasing statistical information concerning data stored in a database.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for managing access to a database, comprising:
    receiving a database query;
    executing the query on the database to obtain a result;
    determining a sensitivity of the received database query, wherein the sensitivity of the received database query comprises a maximum value of a L1 norm of the difference in query result caused by the presence or absence of a single database element;
    generating a noise value from a bimodal probability distribution having a minimum probability at zero noise, wherein the bimodal probability distribution is a u-quadratic probability distribution, and wherein generating the noise value comprises scaling the bimodal probability distribution according to the determined sensitivity;

perturbing the result with the generated noise value; and outputting the perturbed result.

2. The method as claimed in claim 1, wherein the bimodal probability distribution is bounded.

3. The method as claimed in claim 1, wherein the bimodal probability distribution has a mean at zero noise.

4. The method as claimed in claim 1, wherein perturbing the result with the generated noise value comprises adding the noise value to the generated result.

5. The method as claimed in claim 1, further comprising retrieving a utility parameter, and wherein generating the noise value comprises scaling the bimodal probability distribution according to the retrieved utility parameter.

6. The method as claimed in claim 5, wherein scaling according to sensitivity and utility parameter comprises equating a vertical scale parameter of the bimodal probability distribution to a combination of the sensitivity and the utility parameter.

7. The method as claimed in claim 6, wherein the combination of sensitivity and utility parameter comprises the square of a term formed by dividing the utility parameter by the sensitivity.

8. An access management processing element for a database, comprising:

a memory; and a processor, the processor coupled to the memory and configured to:

receive a database query;

execute the query on the database to obtain a result;

determine a sensitivity of the received database query, wherein the sensitivity of the received database query comprises a maximum value of a L1 norm of the difference in query result caused by the presence or absence of a single database element;

generate a noise value from a bimodal probability distribution having a minimum probability at zero noise, wherein the bimodal probability distribution is a u-quadratic probability distribution, and wherein generating the noise value comprises scaling the bimodal probability distribution according to the determined sensitivity;

perturb the result with the generated noise value; and output the perturbed result.

9. The access management processing element as claimed in claim 8, wherein the bimodal probability distribution is bounded.

10. The access management processing element as claimed in claim 8, wherein the bimodal probability distribution has a mean at zero noise.

11. The access management processing element as claimed in claim 8, wherein the processor is further configured to perturb the result with the generated noise value by adding the noise value to the generated result.

12. The access management processing element as claimed in claim 8, wherein the processor is further configured to retrieve a utility parameter, and scale the bimodal probability distribution according to the retrieved utility parameter.

13. The access management processing element as claimed in claim 12, wherein the processor is further configured to equate a vertical scale parameter of the bimodal probability distribution to a combination of the sensitivity and the utility parameter.

14. The access management processing element as claimed in claim 13, wherein the combination of sensitivity and utility parameter comprises the square of a term formed by dividing the utility parameter by the sensitivity.

* * * * *